United States Patent [19]

Brennand et al.

[11] Patent Number: 4,789,860
[45] Date of Patent: Dec. 6, 1988

[54] INTERFACE BETWEEN A RECEIVER AND A SUB-SYSTEM

[75] Inventors: Peter R. Brennand, London; Bruce Murray, Slough, both of England

[73] Assignee: U.S. Philips Corp., New York, N.Y.

[21] Appl. No.: 836,027

[22] Filed: Mar. 4, 1986

[30] Foreign Application Priority Data

Mar. 12, 1985 [GB] United Kingdom ............ 8506324
Nov. 25, 1985 [GB] United Kingdom ............ 8529002

[51] Int. Cl.⁴ .................... H04Q 9/04; H04N 7/08
[52] U.S. Cl. .................... 340/825.510; 358/147; 70/124
[58] Field of Search ............ 340/825.02, 825.51, 340/825.2; 455/5, 78, 79; 375/36, 8; 358/142, 147, 160, 86, 188, 903, 141; 370/73, 124, 69.1; 328/152; 307/241

[56] References Cited

U.S. PATENT DOCUMENTS

| 4,086,534 | 4/1978 | Olson | 375/36 |
| 4,322,854 | 3/1982 | Bundens et al. | 358/86 |
| 4,553,161 | 11/1985 | Citta | 358/86 |
| 4,583,232 | 4/1986 | Howell | 375/8 |
| 4,639,933 | 1/1987 | Howell et al. | 375/36 |
| 4,658,294 | 4/1987 | Park | 358/142 |

OTHER PUBLICATIONS

European Broadcasting Union Documents, "Television Standards for the Broadcasting Satellite Service-Specification of the C-MAC/Packet System"-SPB 284, 3rd revision, Dec. 1984.
"Methods of Conveying C-MAC/Packet signals in Small and Large Community Antenna and Cable Network Installations"-SPB352, Dec. 1984.

Primary Examiner—Donald J. Yusko

[57] ABSTRACT

An interface arrangement between a television receiver (1) and a conditional access sub-system (3), in particular for MAC type television signals comprises a bus having a first line (CKFH) conveying clock signals at television line frequency, a second line (DATA) conveying data during prescribed periods in a four television frame period bus cycle and a third line (DIRN) conveying a signal indicating the direction of data travel on the second line. The bus may be connected to a number of sub-systems (3(1), 3(2)) internal to the television receiver or may be connected via a connector unit (7) to external sub-systems (5(1), 5(2)).

5 Claims, 3 Drawing Sheets

INTERFACE BETWEEN A RECEIVER AND A SUB-SYSTEM

The present invention relates to an interface arrangement between a television receiver and a conditional access sub-system.

The European Broadcasting Union documents "Television Standards for the Broadcasting Satellite Service—Specification of the C-MAC/Packet System'—'—SPB 284, 3rd revised version published December 1984 and "Methods of Conveying C-MAC/Packet Signals in Small and Large Community Antenna and Cable Network Installations"—SPB 352 published December 1984, provide for conditional access of services contained within an r.f. channel. The hardware to enable the user to decode such services falls into two main parts, these being a conditional access sub-system and the MAC signal receiver itself. In general, these two parts will be physically separated from each other and indeed there is one proposal for the conditional access sub-system to be external to the television receiver. With the likelihood of several conditional access sub-systems being present a simple interface is required to carry the necessary data between the two parts.

SUMMARY OF THE INVENTION

It is an object of the present invention to provide such a simple interface.

The invention provides an interface arrangement between a television receiver and a conditional access sub-system, characterised in that said arrangement comprises a bus having a first line conveying clock signals at television line frequency rate from said receiver to said sub-system, a second line conveying data with a bit rate corresponding to that of the clock signal rate from said receiver to said sub-system during a first part of a bus cycle period and from said sub-system to said receiver during the remaining part of said bus cycle period, and a third line conveying a direction signal indicating to said sub-system the direction of data travel on said second line, the bus cycle period having a duration equal to four television frame periods, the data on said second line during the first part of each bus cycle period including the unique address of the sub-system with which the receiver is in communication together with data received by said television receiver.

Such an arrangement provides a simple bus arrangement where the periods of data transmission in either direction are predetermined and where different conditional access sub-systems may be connected to the bus each of which is identified by a unique address. In addition the four frame bus cycle period automatically synchronises with the 256 television frame period between updates of the control words (CW1, CW2) used for descrambling the MAC-packet family of signals.

The third line may be connected in the sub-system to means for preventing data if produced in the sub-system during the first part of the bus cycle period from being applied to the second line but allows such data if produced during the remaining part of the bus cycle period to be applied to the second line.

The third line may be connected in the sub-system to a first input of a NOR gate whose output is connected to the base of a bipolar transistor whose collector is connected to the second line, a second input of the NOR gate being connected to a data source in the sub-system, the transistor being rendered non-conducting during the first part of each bus cycle period by the directional signal on the third line whilst during the remaining part of the bus cycle period the transistor is capable of conducting. In this way, data from the sub-system can only pass to the receiver during those periods when data is not being passed in the other direction.

The bus may additionally comprise fourth and fifth lines for conveying a d.c. supply from said receiver to the sub-system for energising the sub-system. This saves the need for a power supply at the sub-system.

The above and other features of the invention will now be described, by way of example, with reference to the accompanying drawings.

DESCRIPTION OF THE PREFERRED EMBODIMENT

Figure 1:
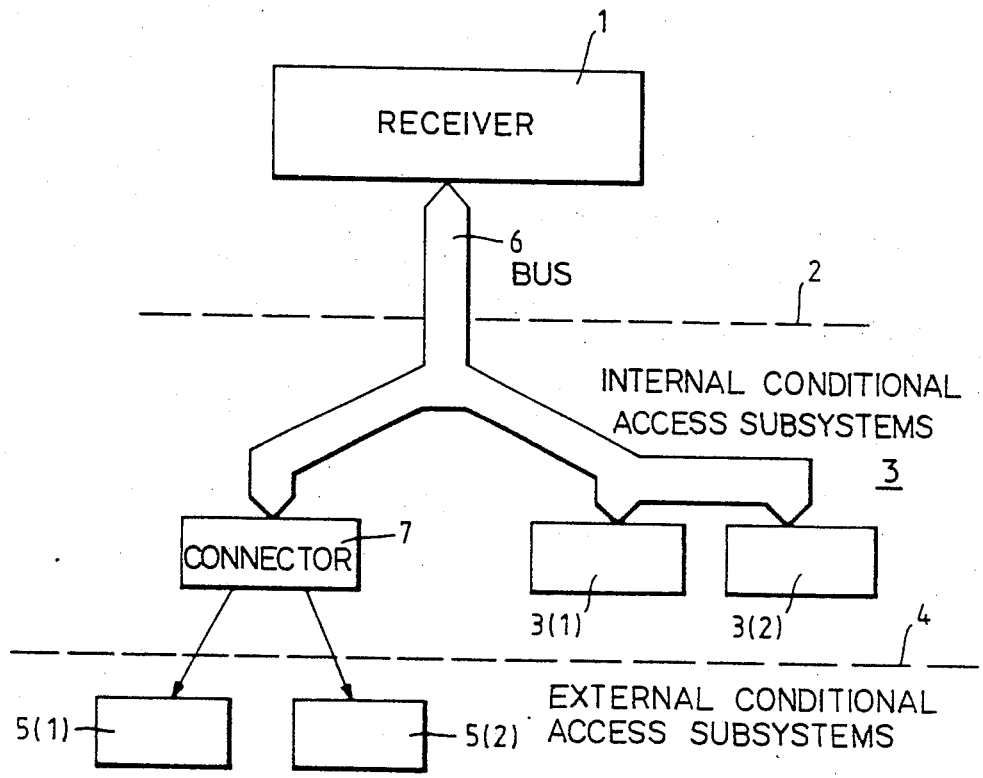
FIG. 1 is a block diagram of an interface arrangement according to the invention.

FIG. 1 is a block diagram showing the connections between a receiver and internal and external conditional access sub-systems. The reference 1 indicates the receiver with its associated signal decoders and which may be suitable for the reception of one or more forms of MAC signals as specified in the EBU documents SPB 284 and SPB 352 referred to above. The receiver 1 will then include the hardware necessary to demultiplex entitlement message packets as specified in part 5 of the above EBU documents. The broken line 2 indicates the boundary between the receiver 1 and an internal conditional access (CA) sub-system or systems 3 which although physically separated from each other may be accommodated in the television receiver. In addition the broken line 4 indicates the boundary between the television receiver and an external conditional access (CA) sub-system or systems 5.

The receiver 1 and internal CA sub-system(s) 3 are interconnected by way of an interface bus 6, a further interface/connector being provided to interconnect the television receiver and the external CA sub-system(s) 5 which is formed by a receiver microprocessor and connector 7 connected to the interface bus 6. The CA sub-systems contain the customer address, the software for decoding the over-air data and the decryption algorithms. For television receivers that require to decode separately encrypted services simultaneously then a number of sets of conditional access sub-systems and consequently interfaces will be required. FIG. 1 shows two internal CA sub-systems 3(1) and 3(2) and two external CA sub-systems 5(1) and 5(2) connected to a common interface.

Figure 2:
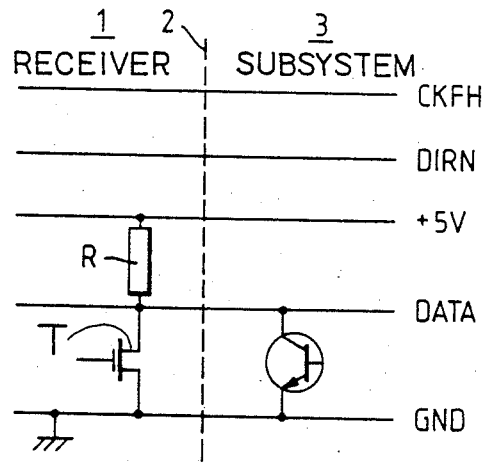
FIG. 2 is a diagram of a bus for use with the arrangement of FIG. 1.

FIG. 2 shows the five lines required for the bus 6 of FIG. 1. The reference 2 again indicates the boundary between the receiver 1 and the CA sub-system(s) 3. The five lines are as follows:

CKFH—conveys line frequency (15.625 kHz) clock pulses positive edges of which synchronise data transitions. Compatible with TTL.

DIRN—indicates the direction of transmission on the DATA line. When 'high' denotes receiver is transmitting, 'low' denotes CA sub-system is transmitting.

Transitions synchronised to the positive edges of CKFH. Compatible with TTL.

+5 V—conveys +5 volts for energising CA sub-system.

DATA—bi-directional data line (open drain/collector input/output). Compatible with TTL. For pull-up, resistor R is placed on receiver side at interface boundary. Data as seen at interface should be logically 'true'.

GND—line at ground or earth potential.

The field effect transistor (FET) T shown on the receiver side 1 of the interface 2 represents an open drain, n-channel FET at the output of a MOS integrated circuit. This FET has its source connected to ground whilst its drain is connected to the data bus, with control signals being applied to its gate.

Figure 3:
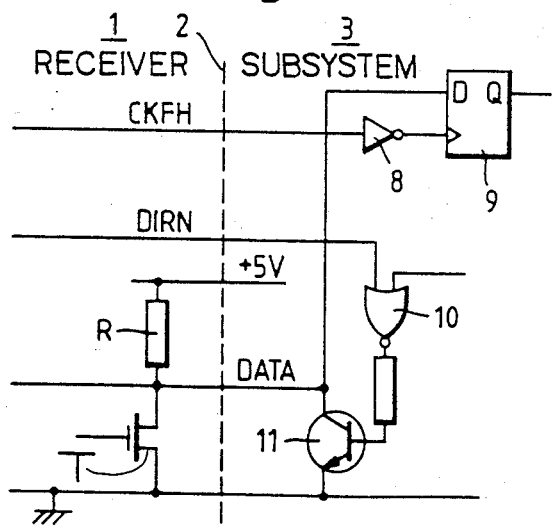
FIG. 3 is a modification of the diagram of FIG. 2 including control logic.

FIG. 3 shows a possible bus control logic for a CA sub-system shown in conjunction with the bus 6 of FIG. 2. Data from the DATA line is applied to the signal input of a resynchronising unit 9 which in this case is the D input of a D type flip-flop. Clock pulses from the CKFH line are conveyed to an inverter 8 the inverted output of which is applied to the clock pulse input of the flip-flop 9. This ensures that the flip-flop 9 clocks out valid data.

In the CA sub-system 3 the DIRN line, in addition to being connected to the processor of the sub-system, is connected to a first input of a NOR gate 10 the second input of which receives data from the sub-system processor. During those periods when data is being passed from the receiver to the sub-system with the DIRN line 'high' the output of the NOR gate 10 is forced 'low' to turn off a bipolar transistor 11 at its base whose collector is connected to the DATA line. This prevents data from the processor in the sub-system from corrupting data on the DATA line should such processor data happen to be present at times when receiver data is present. At other times when the DIRN line is 'low' data can pass from the sub-system processor to the DATA line via NOR gate 10 and transistor 11.

Figure 4:
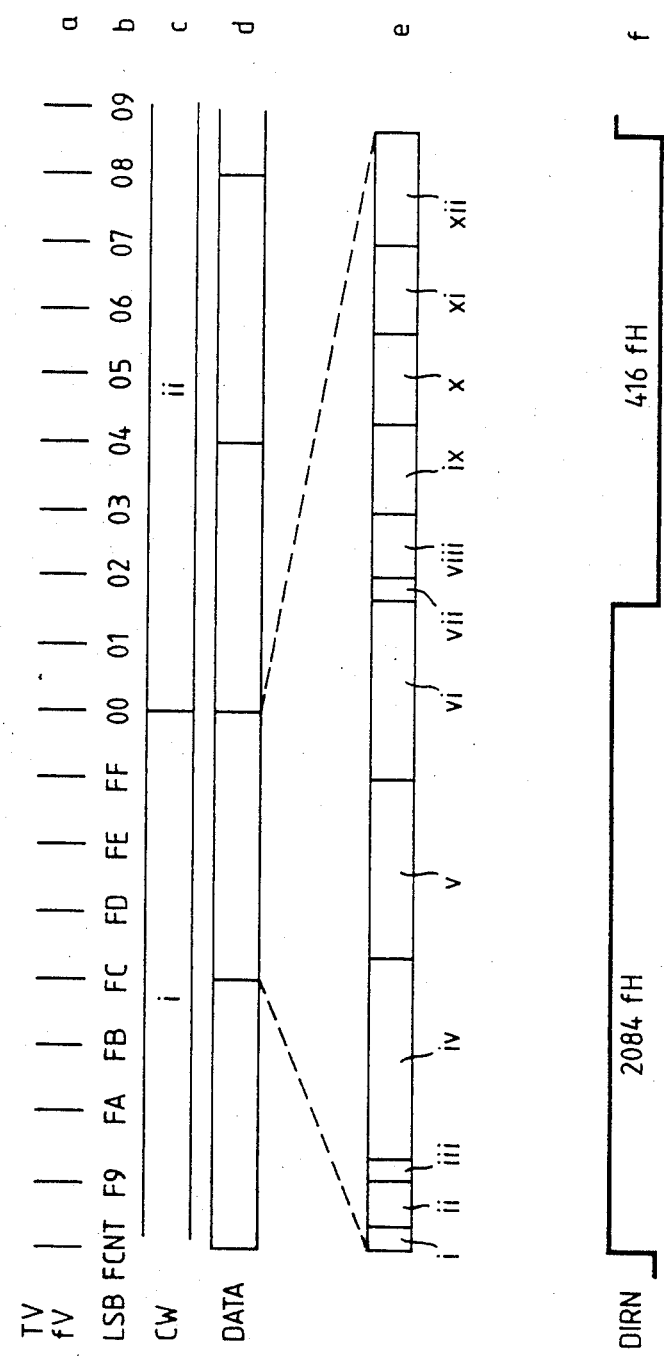
FIG. 4 shows signal and timing diagrams for the bus of FIG. 2.

FIG. 4 shows the DATA and the DIRN signals conveyed by the bus 6 together with frame and control word information. The periods indicated between the vertical lines in FIG. 4a are television frame periods each of 40 m secs, whilst FIG. 4b gives the eight least significant bits of the frame count for the frame periods of FIG. 4a in hexadecimal. In FIG. 4c the division at the frame having the count 00 is the boundary between old (i) and new (ii) control words CW1 and CW2 in use and produced in the CA sub-system, these control words being changed every 256 frames. The data transmitted over the bus 6 of FIG. 1 is shown in FIGS. 4d and 4e, FIG. 4d showing that this data is transmitted in equal periods each of which is the length of four television frame periods whilst FIG. 4e is the expansion of one such data period. FIG. 4f is to the same scale as FIG. 4e and shows the direction of transmission signal DIRN which is 'high' for 2084 television line periods (fH) during which data passes from the receiver to the CA sub-system and 'low' for 416 line periods during which data passes from the CA sub-system to the receiver. The composition of each data block as shown in FIG. 4e is as follow:

i. 1 byte unique address for CA sub-system. Enables the receiver to operate with a number of sub-systems and individually "talk" to each sub-system by the use of a unique address. Thus each sub-system must be allocated a unique address.

ii. 28 bit frame count. The algorithm within the CA sub-system requires this for synchronisation and timing.

iii. 1 byte output status. The information subsequently sent may be "old" or "new" and the status byte enables the sub-system to ignore "old" data that it has already acquired.

iv. 91 bytes entitlement checking message (ECM). This is sometimes known as 'service specific data' and allows the CA sub-system to derive the control words for a particular service or package of services.

v. 84 bytes shared customer validation block (CVB). This is part of the entitlement management messages (EMM) and addresses groups of customers.

vi. 81 bytes unique customer block (UCB). Forms the other part of entitlement management messages (EMM).

The above blocks i to vi are conveyed from the receiver to the CA sub-system.

vii. 1 byte input status. Has the same function as (i) above.

viii. 3 bytes shared customer address. To enable the receiver to acquire the correct shared customer validation from the entitlement management messages packets the receiver requires the shared address of the customer.

ix. 5 bytes unique customer address. For the receiver to acquire the unique customer address from the entitlement management addresses packets the receiver requires the unique address of the customer.

x. 8 bytes control word 1 (CW1).

xi. 8 bytes control word 2 (CW2).

xii. 27 bytes for display text. Conveyance of simple text intended for user guidance and 'confidence' e.g. price codes of service.

The above blocks vii to xii are conveyed from the CA sub-system to the receiver.

In the above data all bytes are 8 bits in length with the bit rate corresponding to the line rate.

The composition of the above data may be modified in the following manner.

iv. increased to 91 bytes to provide 90 bytes of information (corresponding to the data in a packet) plus 1 byte for signalling if the entitlement checking message is in one or more packets.

xi. reduced to 26 bytes to compensate for increase in (iv).

With these modifications the four frame period for the data is retained but the direction of transmission signal DIRN is now "high" for 2092 line periods to allow data to pass from the receiver to the CA sub-system whilst this signal is "low" for 408 line periods during which data passes from the sub-system to the receiver. It is obvious that other modifications may be made to the various periods and content provided that the data is retained within a four frame period.

What is claimed is:

1. An interface arrangement between a television receiver and a conditional access sub-system comprising: a bus having a first line conveying clock signals at television line frequency rate from said receiver to said sub-system, a second line conveying data with a bit rate corresponding to that of the clock signal rate from said receiver to said sub-system during a first part of a bus cycle period and from said sub-system to said receiver during the remaining part of said bus cycle period, and a third line conveying a direction signal indicating to said sub-system the direction of data travel on said second line, the bus cycle period having a duration equal to four television frame periods, the data on said second line during the first part of each bus cycle period including the unique address of the sub-system with which the receiver is in communication together with data received by said television receiver.

2. An arrangement as claimed in claim 1, wherein said third line is connected in said sub-system to means for preventing data if produced in said sub-system during the first part of said bus cycle period from being applied to said second line but allows such data if produced during the said remaining part of said bus cycle period to be applied to said second line.

3. An arrangement as claimed in claim 1, wherein said third line is connected in said sub-system to a first input of a NOR gate whose output is connected to the base of a bipolar transistor whose collector is connected to said second line, a second input of said NOR gate being connected to a data source in said sub-system, said transistor being rendered non-conducting during the first part of each bus cycle period by said directional signal on said third line whilst during the remaining part of said bus cycle period said transistor is capable of conducting.

4. An arrangement as claimed in claim 1, wherein said bus additionally comprises fourth and fifth lines for conveying a d.c. supply from said receiver to said sub-system for energising the sub-system.

5. An interface arrangement between a television receiver and a conditional access sub-system, comprising a bus having a first line conveying clock signals at television line frequency rate from said receiver to said sub-system, a second line conveying data with a bit rate corresponding to that of the clock signal rate from said receiver to said sub-system during a first part of a bus cycle period and from said sub-system to said receiver during the remaining part of said bus cycle period, and a third line conveying a direction signal indicating to said sub-system the direction of data travel on said second line, the bus cycle period having a duration equal to a plurality of television frame periods, the data on said second line during the first part of each bus cycle period including the unique address of the sub-system with which the receiver is in communication together with data received by said television receiver.

* * * * *